United States Patent
Conger et al.

(10) Patent No.: US 12,060,130 B1
(45) Date of Patent: Aug. 13, 2024

(54) DEVICE AND SOFTWARE THAT PROVIDES HANDLEBAR CONTROL AND MOTORCYCLE PERFORMANCE DATA WIRELESSLY TO A PORTABLE COMPUTING DEVICE

(71) Applicants: Keith Edward Conger, Colorado Springs, CO (US); Wayne Steven Black, Seaside, CA (US)

(72) Inventors: Keith Edward Conger, Colorado Springs, CO (US); Wayne Steven Black, Seaside, CA (US)

(*) Notice: Subject to any disclaimer, the term of this patent is extended or adjusted under 35 U.S.C. 154(b) by 199 days.

(21) Appl. No.: 17/563,982

(22) Filed: Dec. 28, 2021

Related U.S. Application Data

(60) Provisional application No. 63/131,212, filed on Dec. 28, 2020.

(51) Int. Cl.
   *B62K 11/14* (2006.01)

(52) U.S. Cl.
   CPC .................... *B62K 11/14* (2013.01)

(58) Field of Classification Search
   CPC ........................................ B62K 11/14
   See application file for complete search history.

(56) References Cited

U.S. PATENT DOCUMENTS

| | | | | |
|---|---|---|---|---|
| 2007/0276572 A1* | 11/2007 | Siemer | ................... | G07C 5/008 701/1 |
| 2011/0108397 A1* | 5/2011 | Kodaira | ................. | B62K 23/02 200/61.54 |
| 2014/0343753 A1* | 11/2014 | Kirsch | ................. | G07C 5/0816 701/2 |

FOREIGN PATENT DOCUMENTS

BR   102017010086 A   * 12/2018

OTHER PUBLICATIONS

BR 102017010086 English translation (Year: 2024).*

* cited by examiner

*Primary Examiner* — Jelani A Smith
*Assistant Examiner* — Paul A Castro
(74) *Attorney, Agent, or Firm* — Plager Schack LLP; Mark H. Plager; Alexis J. Saenz

(57) ABSTRACT

A device and communication software connect controls/features of a vehicle driven by handlebar control, for example, a motorcycle, with a universal handlebar-based control system. Embodiments also provide access to a mobile computing device and operate the mobile computing device through the handlebar-based control system. Aspects of the subject disclosure remove the need for a rider to take their hands off the handlebars and eyes off the road to manipulate a portable computing device or control on-board vehicle functions. The access to the controls/features of a vehicle provides the rider alerts to potential safety events which can be seen through the on-board display of the vehicle or a mobile computing device mounted to the vehicle and connected to the control system.

7 Claims, 7 Drawing Sheets

DEVICE AND SOFTWARE THAT PROVIDES HANDLEBAR CONTROL AND MOTORCYCLE PERFORMANCE DATA WIRELESSLY TO A PORTABLE COMPUTING DEVICE

CROSS-REFERENCE TO RELATED APPLICATIONS

This application claims benefit under 35 U.S.C. § 119(e) of U.S. Provisional Application having Ser. No. 63/131,212 filed Dec. 28, 2021, which is hereby incorporated by reference herein in its entirety.

BACKGROUND

The embodiments herein relate generally to automobile control systems, and more particularly, to a device and software that provides handlebar control and motorcycle performance data wirelessly to a portable computing device.

Mobile devices have become ubiquitous and provide vastly greater functionality than traditional GPS Navigation systems. Because of this, many riders have opted to use their smart device for navigation and entertainment on their motorcycles. Safe motorcycle riding requires the motorcyclist maintain full control of the motorcycle at all times. The ability/need to manipulate a mobile device while riding is a very practical need for communication, navigation and motorcycle diagnostics. Attempting to manipulate a mobile device while riding requires the motorcyclist to momentarily take their hands from the handlebars and is inherently dangerous.

Current devices only control the motorbike's existing cluster and/or traditional GPS device. This leaves the rider to manipulate the mobile phone with their hands off the handlebars. Other devices do not communicate with the motorcycle's existing electrical system to provide audio and visual cues for important safety related events.

SUMMARY

In one aspect of the subject technology, a handlebar-based control system is disclosed. The system comprises: human interface control (HIC) module configured for mounting onto a motorcycle handlebar; a central control module electronically connected to the HIC module, wherein user input into the HIC module is read by the central control module; a mount configured to receive a mobile electronic device, wherein the mount includes an interface port connecting the mobile electronic device to the central control module and wherein input into the HIC module controls operation of the mobile electronic device.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
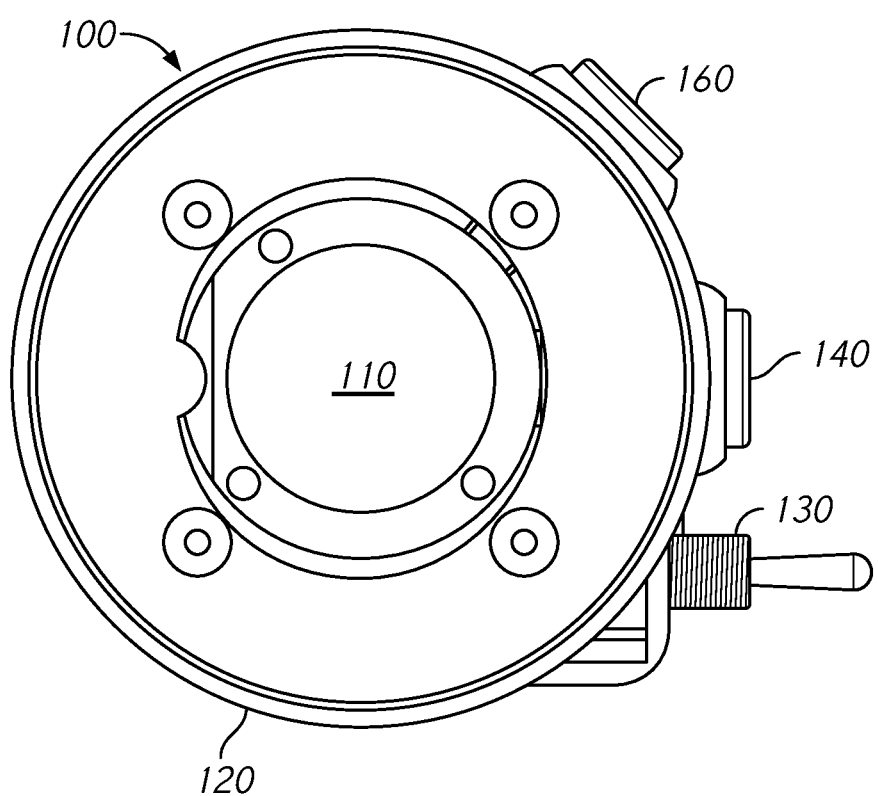
FIG. 1 is an end view of an apparatus for wireless control of a computing device according to an embodiment.

In general, and referring to the Figures, embodiments of the present disclosure provide a device and communication software which connect controls/features of a motorcycle with a universal handlebar-based control system that access a mobile computing device and operates the mobile computing device through the handlebar-based control system. Aspects of the subject disclosure remove the need for a rider to take their hands off of the handlebars and eyes off the road to manipulate a portable computing device or vehicle instrument and to be alerted of potential safety events.

As shown in the Figures, the subject device may be mounted onto or around a handlebar. By way of emulating the ubiquitous PC keyboard and integrating seamlessly into standard motorcycle handlebar controls, the subject device allows the motorcyclist to keep their hands on the steering and braking controls of the motorcycle at all times while manipulating a mobile computing device and other connected devices such as action cameras by engaging with the handlebar-based control system (which may also be referred to as a human interface control (HIC)). In some embodiments, the output of a user's manipulation of the handlebar-based control system may be seen in a user interface of the mobile computing device. The device and software also provide visual and audio cues derived from performance and fault data provided from the motorbike's ECU. Some examples include low tire pressure alerts and ice warning.

In an exemplary embodiment, the control device may be generally circular and wrap around a handlebar in a location proximate a user's hand grip. The control device may include various input mechanisms including for example, a rotary dial, capacitive touch buttons, spring buttons, etc. Triggering one or more inputs sends a command signal. In some embodiments, the inputs may be customized based on user preferences. The control device may be electronically connected to a control module. In a system embodiment, the subject technology includes a mount configured to hold a mobile computing device. The mount may include a port interface for receiving the control signals from the control module. Some embodiments may include a port interface for the mobile computing device to connect to the control module so that communication between the mobile computing device and the handlebar-based control system is bridged. In some embodiments, the control module may be connected to the motorcycle's control unit so that data related to operation of the motorcycle may be accessed and displayed on the mobile computing device if requested. Some embodiments may connect the mobile computing device to the control module via short range radio protocol such as through the Bluetooth® standard.

In another aspect, the subject disclosure includes control software which may be provided as an app in the mobile computing device. The companion software running on the mobile computing device translates the performance and fault date provided by the motorcycle control unit into audible and visual cues to alert the rider to important safety events. This data is may be fused with sensor data and is used for additional safety event alerting and logging. The companion software running may also provide a displayed control hub to control a variety of other actions such as control smart fuse blocks, cameras, garage door openers, radios, etc. which may be accessed through one or more user interfaces. An example user interface includes a plurality of quick tasks that the rider may access/perform with a quick selection through the UI once it is accessed.

Some embodiments may include a host server which provides administration of the companion app. The host server may communicate with the app and rider through the wireless telephony available in the mobile computing device.

Figure 2:
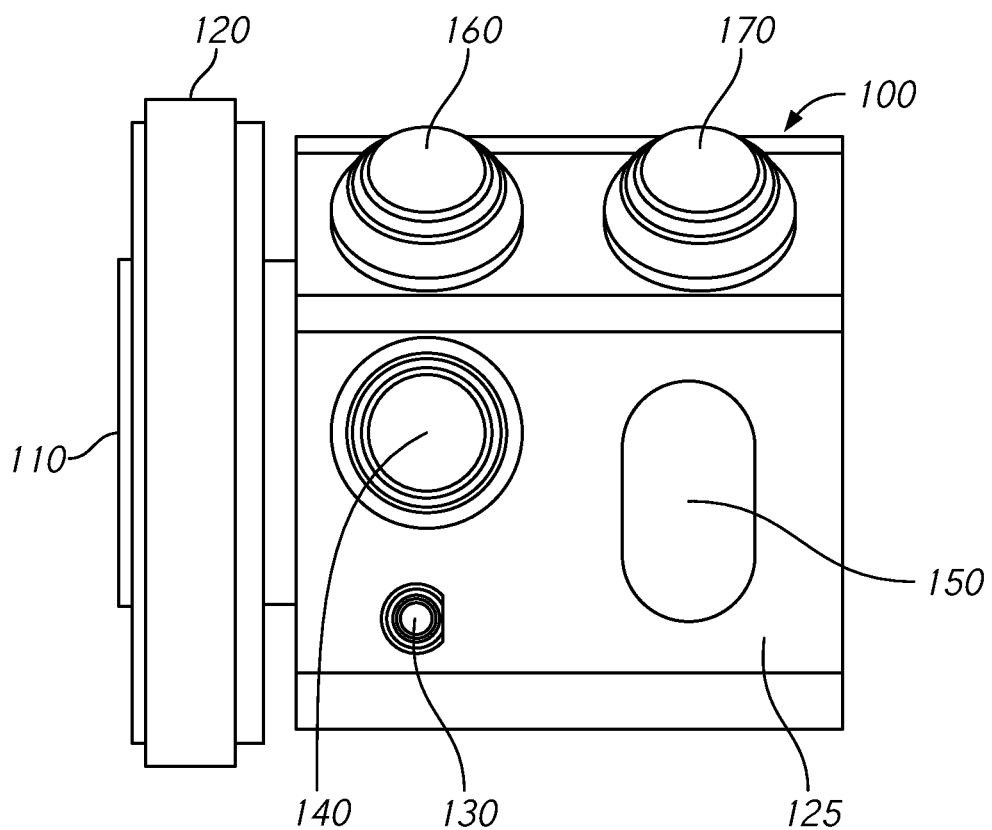
FIG. 2 is a front view of the apparatus of FIG. 1.
Figure 3:
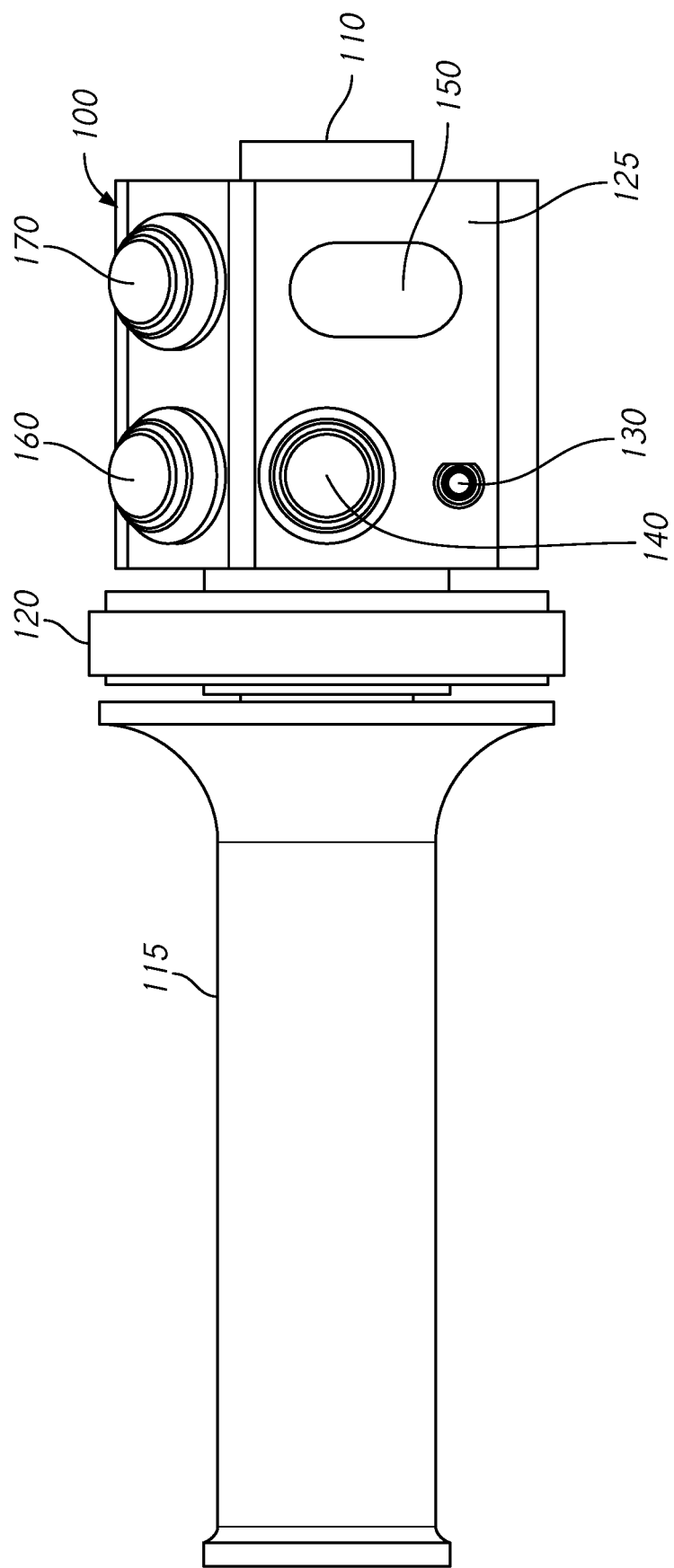
FIG. 3 is a front view of the apparatus of FIG. 1 mounted onto a handlebar according to an embodiment.

Referring now to FIGS. 1-3, a handle-bar based control apparatus 100 (sometimes referred generally as the "apparatus 100") is shown according to an illustrative embodiment. For sake of illustration, the apparatus may be used on vehicles that are controlled using a handlebar; for example, motorcycles, bicycles, tri-wheeled vehicles, jet-skis, and similar. The apparatus 100 is configured to wrap around or mount onto a handlebar 110. In some embodiments, the apparatus 100 the apparatus 100 is retro-fit onto existing vehicle handlebars. In some embodiments, the apparatus 100 is removable and re-attachable to existing handlebars. In some embodiments, the apparatus 100 is factory integrated into a vehicle's handlebar system. In some embodiments, the apparatus 100 may be configured to mount adjacent another original equipment vehicle control device (for example, an accelerator 115 as shown in FIG. 3). The apparatus 100 may include a control panel 125. The control panel 125 may house one or more input devices. The input devices may be used to control functions and select features for on-board vehicle functions or to select/operate features in user interfaces displayed in a computing device. As will be appreciated, by incorporating the apparatus 100 on the handlebar 115, a user is able to control features/functions on the vehicle or computing device without having to release control of the handlebar 115, thus promoting safety while providing convenient access to vehicle functions or display features.

In an illustrative embodiment, the control panel 125 includes for example, a toggle switch 130 for activating operation of apparatus 100 functions. Some embodiments include a rotary dial 120 for scrolling through options. Depressible buttons 140, 160, and 170. Buttons 160 and 170 may be positioned adjacent each other for common positive/negative functions such as volume up/down, brightness up/down, left/right movement through pages, etc. Some embodiments may include a capacitive sensor 150 for tap/touch type applications.

Figure 4:
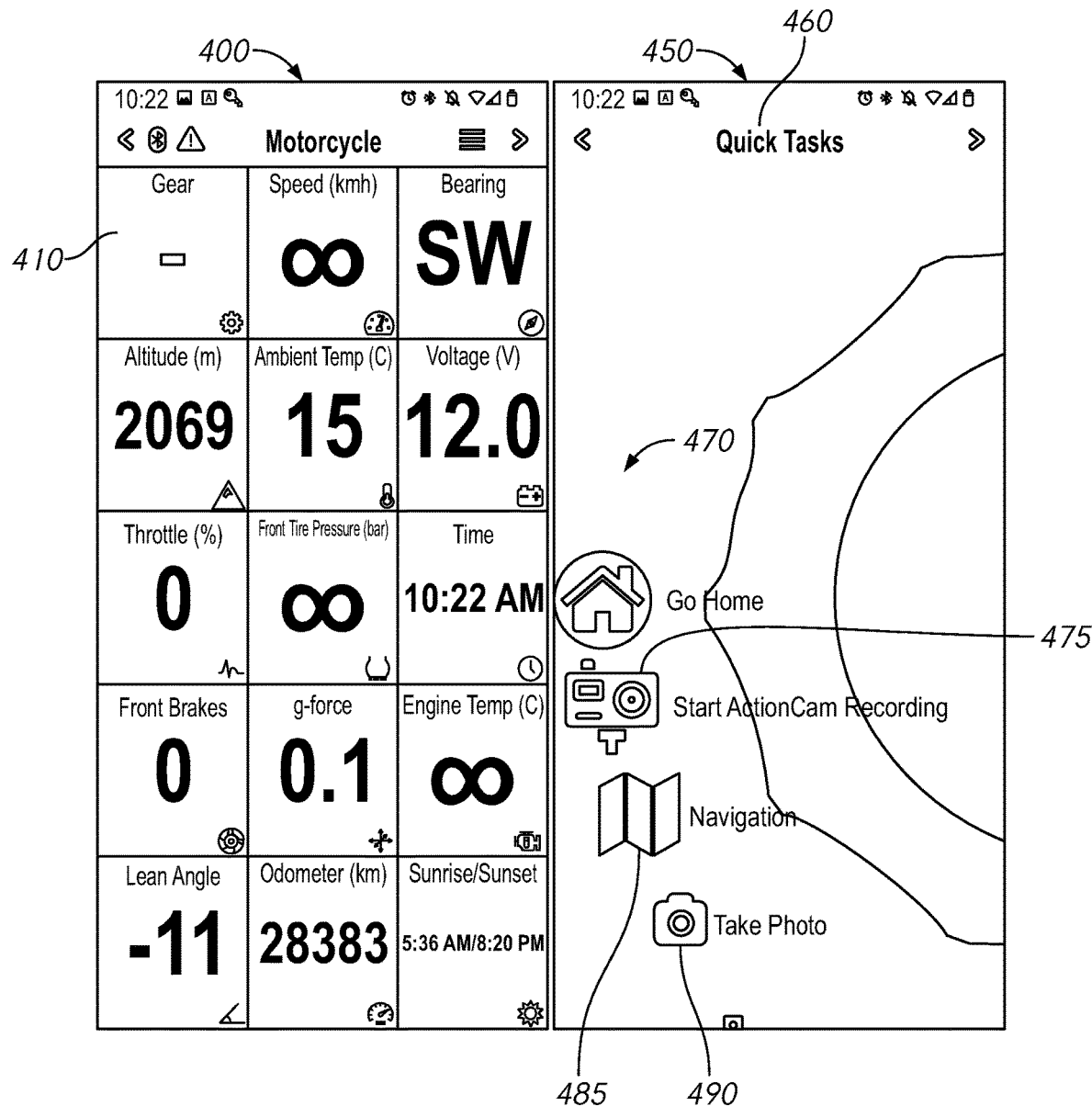
FIG. 4 is a screenshot of user interfaces controlled by the apparatus of FIG. 1, on a digital display of a computing device according to embodiments.

Referring now to FIG. 4, user interfaces (UI) 400 and 450 of a software application (referred to in one example farther below as an end user software app 670) are shown according to illustrative embodiments. UIs 400 and 450 may be displayed on a digital screen of a mobile computing device (for example, a smart phone, a computing tablet, a wearable device, etc.). In some applications, the computing device is not part of the original vehicle equipment and may be mounted onto a fixture for the vehicle within the user's line of sight. As shown in UI 400, an array of vehicle related data may be shown in cells 410. The amount of information displayed is beyond the normal information displayed in most motorcycles because of the limited dashboard room in original motorcycle equipment space. The user may switch UIs by triggering one of the aforementioned input devices. UI 450 for example, provides display of selectable features 470 on a quick tasks menu 460. The selectable tasks include for example, a camera video recording function 475, a navigation function 480, and a picture taking function 485. As will be understood functions 475 and 485 are available when the subject technology is used with a computing device or vehicle system with an integrated camera. In an exemplary operation, the user may for example, use the rotary dial 120 to scroll one of the selectable tasks into position. The button 140 for example, may be used to confirm activation of the selected function. The user may accomplish the above sequence while continuing to drive their vehicle.

Figure 5:
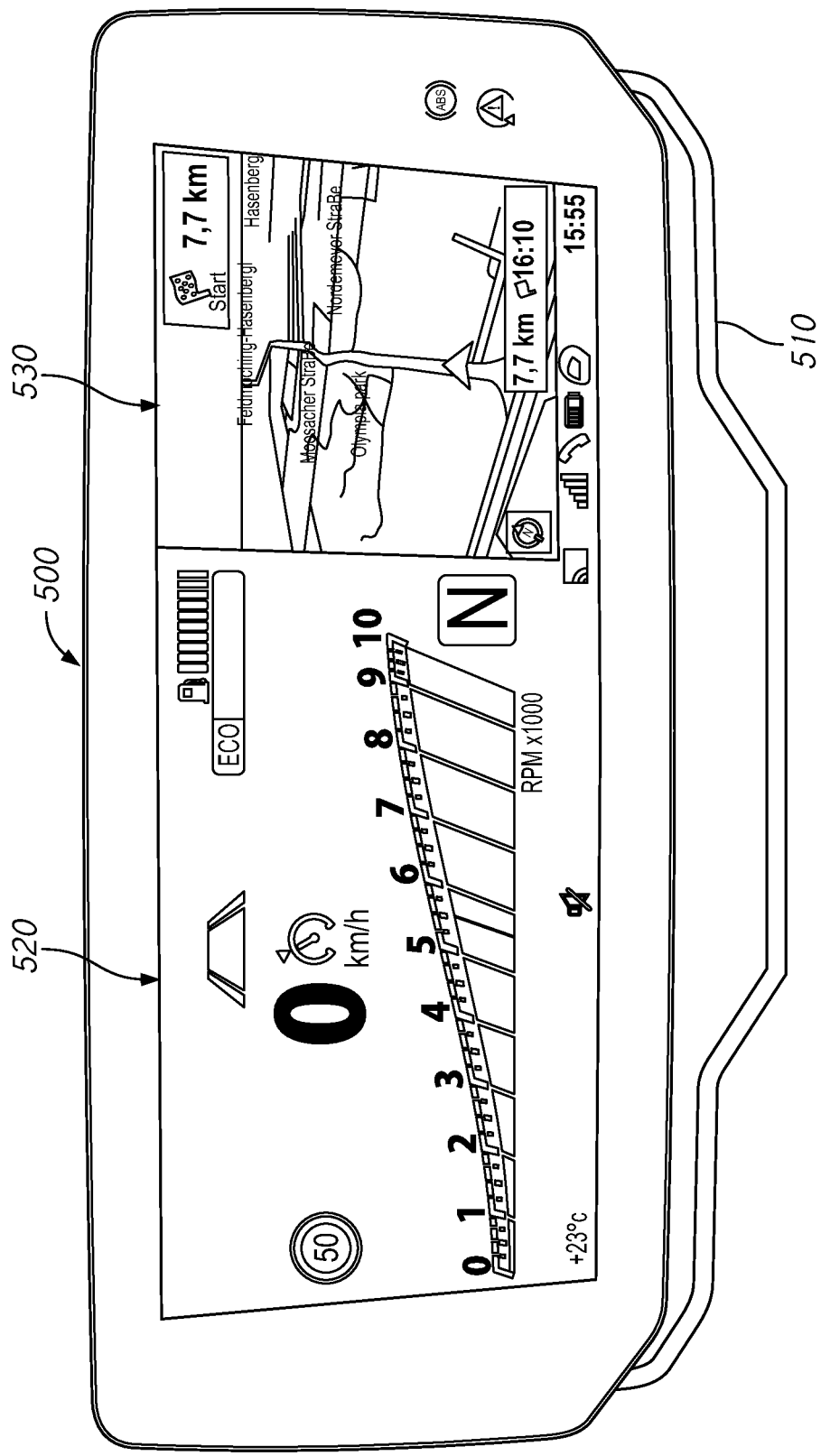
FIG. 5 is a computing device, mounted to a motorcycle dashboard in wireless connection with the apparatus of FIG. 1 according to some embodiments.

FIG. 5 shows an instrument cluster 500 according to another embodiment. The instrument cluster 500 may be an on-board vehicle instrument panel connected to the apparatus 100 (either by hard-wire or wireless communication). Or in some embodiments, the instrument cluster panel 500 may be a mobile computing device removably attached to a mount 510. The instrument cluster panel 500 may include a digital display 520 of vehicle operation information including for example, speed, fuel gauge level, RPM level, current gear, etc. In embodiments where the instrument cluster panel 500 is provided on a mobile computing device, the display panel 520 may be generated by the software application connected to the apparatus 100. Some embodiments may include an auxiliary panel 530 displaying other functions or features which may be selected through the apparatus 100. In the illustrative embodiment shown, the auxiliary panel 530 id displaying a navigation map feature, however it will be understood that other features may be shown in the auxiliary panel 530.

Figure 6A:
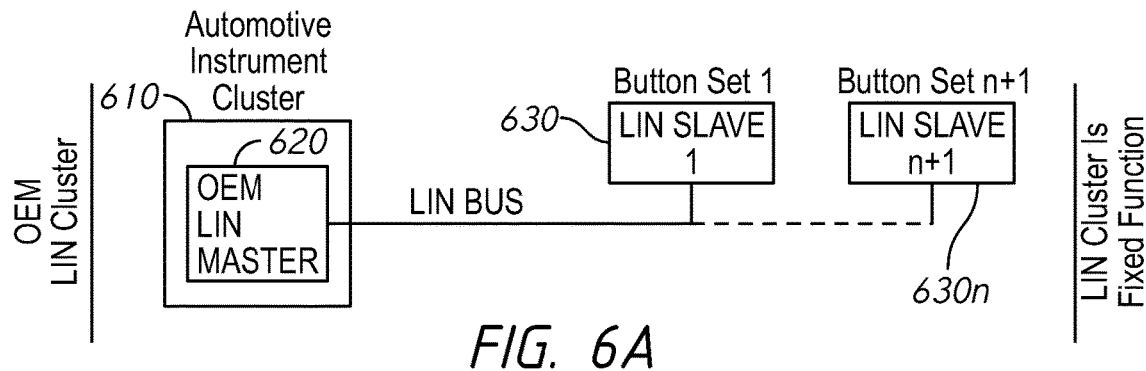
FIG. 6A is a block diagram of a prior art local interconnect network cluster connection scheme.
Figure 6B:
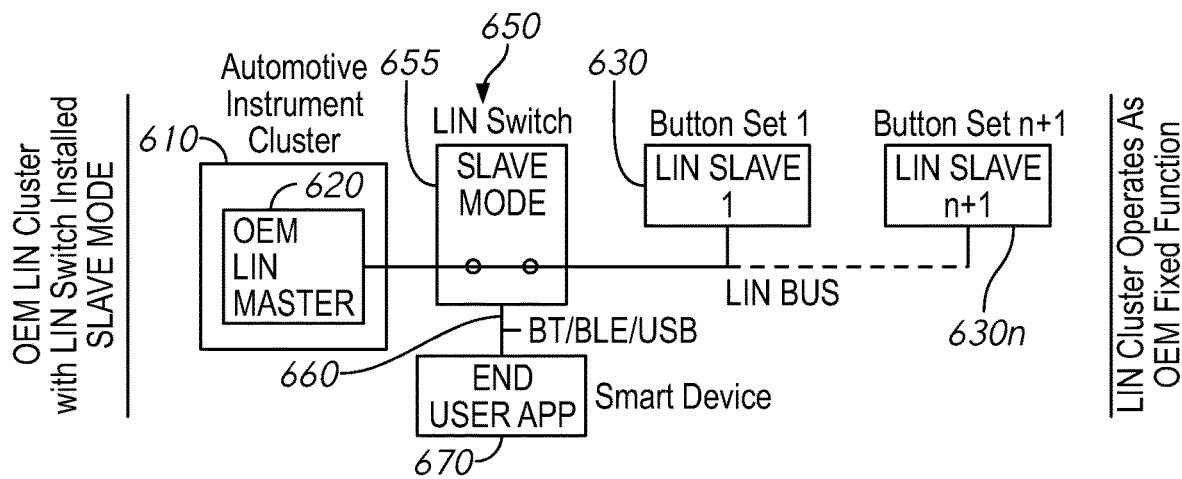
FIG. 6B is a block diagram of a local interconnect network cluster connection scheme in a slave mode including an apparatus of the subject technology according to one embodiment.
Figure 6C:
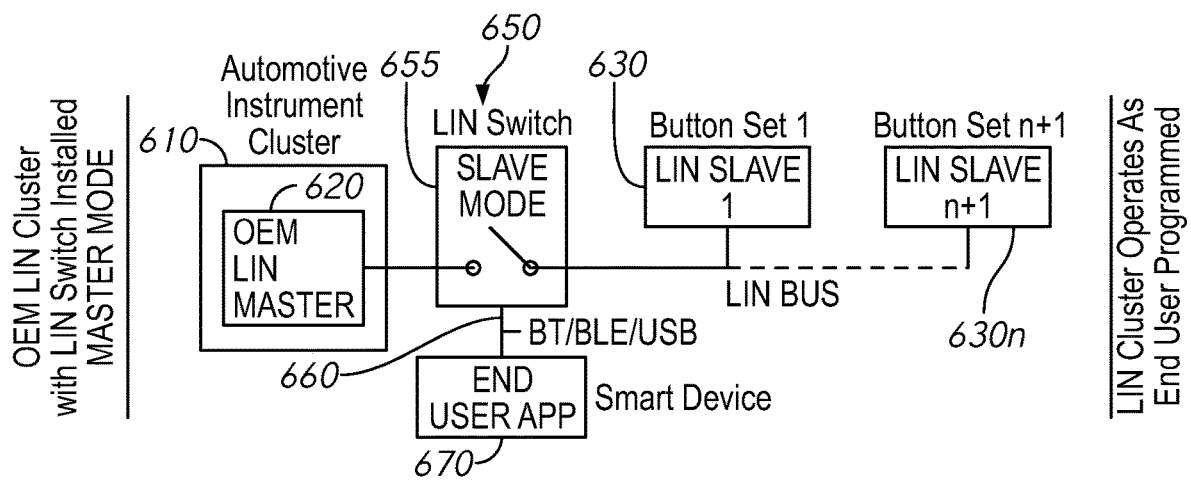
FIG. 6C is a block diagram of a local interconnect network cluster connection scheme in a master mode including an apparatus of the subject technology according to one embodiment.

Some embodiments of the subject technology provide control of the on-board vehicle systems through a control module integrated into the apparatus 100. Referring to FIGS. 6A, 6B, and 6C, a comparison of control schemes are shown according to some embodiments. FIG. 6A shows a conventional control scheme of an original equipment manufacturer (OEM) local interconnected network (LIN) instrument cluster for on-board system functions. There is conventionally a direct connection between an OEM LIN master controller 620 in an instrument cluster 610 and buttons associated with LIN slave functions 630-630n on a LIN bus line.

In the subject technology (shown in FIGS. 6B and 6C), a control module in the apparatus 100 may provide alternate modes of control; a master mode and a slave mode. The slave mode is shown in FIG. 6B. The master mode is shown in FIG. 6C. In an embodiment of the subject technology, the LIN control system 650 includes a LIN switch controller 655 positioned in communication between the OEM LIN master controller 620 and the plurality of LIN slave functions 630-630n. The LIN switch controller 655 may be a control module including a processor or control circuit operable to handle control of the functions described herein. The LIN switch controller 655 may include a signal port 660 (which may be for example, a wired port or wireless signal module) receiving commands from an end user software app 670. In the slave mode (FIG. 6B), the LIN cluster operates as an OEM fixed function. The end user app 670 has control of the on-board vehicle functions and may control these functions by using the apparatus 100. In some embodiments, on-board system functions and features in the computing device may be modified by end user programming providing a customizable vehicle driving experience. In the master mode, the LIN cluster operates according to end user programming. For example, the connection from the apparatus 100 and the on-board systems is displaced. The control panel 125 on the apparatus 100 may only operate the functions visible through the computing device operating the end user software app 670.

Figure 7:
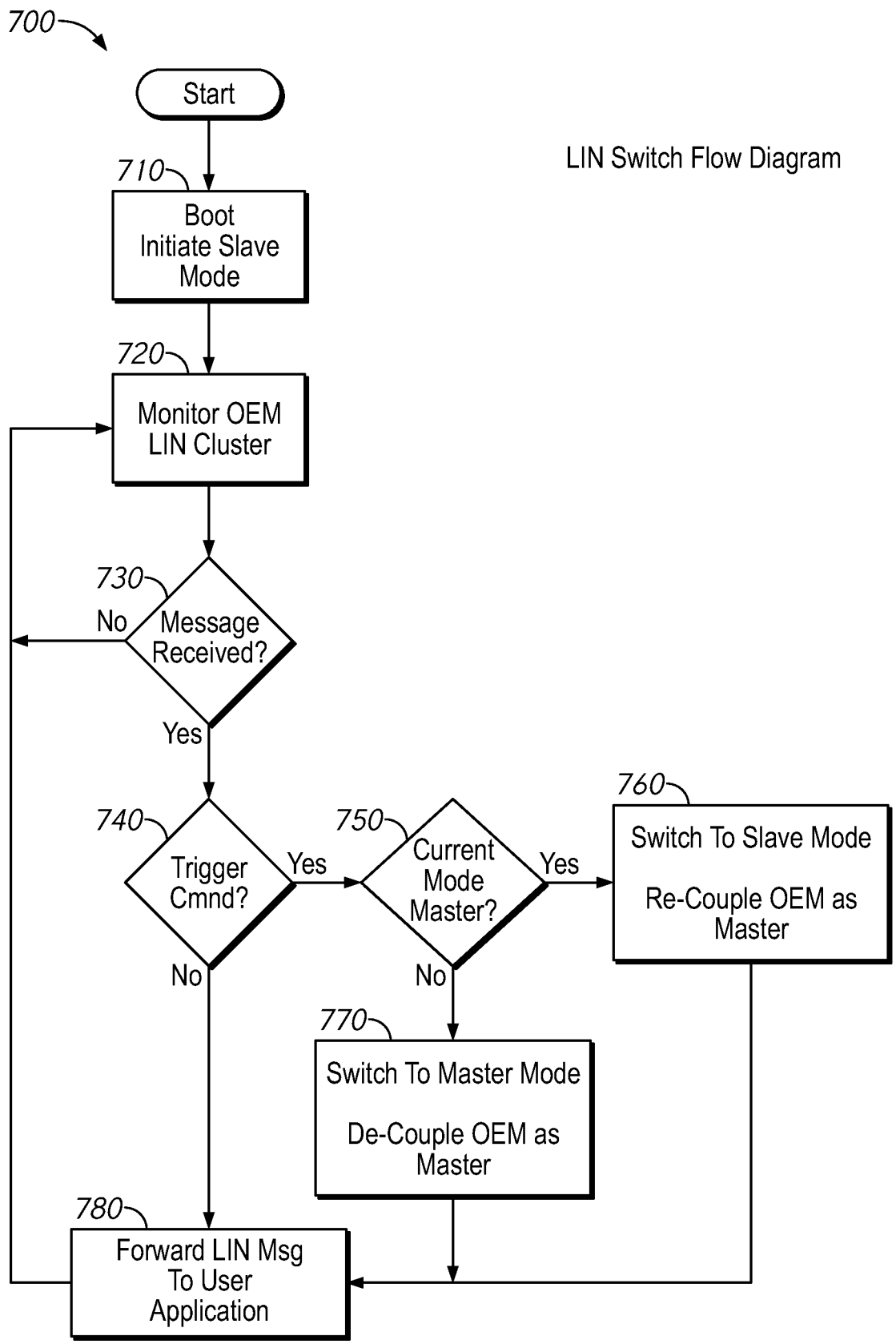
FIG. 7 is a flowchart of a process for controlling LIN connected operations according to an embodiment.

FIG. 7 shows a process 700 for controlling LIN connected operations according to an illustrative embodiment. The process 700 (and steps described herein) may be performed by the processor or control circuit of the LIN switch controller 655 (FIG. 6). Control of LIN switching operations may begin with a boot up initiating 710 slave mode. The controller may monitor 720 the OEM LIN cluster. Generally speaking, the controller may be polling 730 for message received by one of the apparatus' 100 input devices. When a message is received, the controller determines 740 whether the signal was associated with a trigger command from one of the input devices. Non-trigger commands may be forwarded 780 to the end user software application for determining how to handle the message. For trigger commands, the controller may determine 750 whether the current LIN mode is in the master mode. If the system is in the master mode, the controller may switch 760 to slave mode and re-couple the OEM LIN master module as the master controller. If the system was not in master mode, then the controller may switch 770 the system to master mode and de-couple the OEM LIN master module from control of LIN elements.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "user interface," "module," or "system." Furthermore, aspects of the disclosed technology may take the form of a computer program product embodied in one or more computer readable media having computer readable program code embodied thereon.

Aspects of the disclosed invention are described above with reference to block diagrams of methods, apparatus (systems) and computer program products (as software) according to embodiments of the invention. It will be understood that each block of the block diagrams, and combinations of blocks in the flowchart illustrations and/or block diagrams, can be implemented by computer program instructions. These computer program instructions may be provided to the processor of a computer system/server, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The components of the computer system/server may include one or more processors or processing units, a system memory, and a bus that couples various system components including the system memory to the processor. The computer system/server may be for example, tablet devices, mobile telephone devices, server computer systems, handheld or laptop devices, programmable consumer electronics, network PCs, dedicated network computers, and distributed cloud computing environments that include any of the above systems or devices, and the like. The computer system/server may be described in the general context of computer system executable instructions, such as program modules, being executed by the computer system. A host server may be practiced in distributed cloud computing environments where tasks are performed by remote processing devices that are linked through a communications network. In a distributed cloud computing environment, program modules may be located in both local and remote computer system storage media including memory storage devices.

The computer system/server may typically include a variety of computer system readable media. Such media could be chosen from any available media that is accessible by the computer system/server, including non-transitory, volatile and non-volatile media, removable and non-removable media. The system memory could include one or more computer system readable media in the form of volatile memory, such as a random-access memory (RAM) and/or a cache memory. By way of example only, a storage system can be provided for reading from and writing to a non-removable, non-volatile magnetic media device. The system memory may include at least one program product having a set of program modules that are configured to carry out the functions described above.

Persons of ordinary skill in the art may appreciate that numerous design configurations may be possible to enjoy the functional benefits of the inventive systems. For example, while the subject disclosure was described in the context of use on a motorcycle, variations are contemplated which may be used on other hand-controlled steering systems including for example, bicycles (and other handle-bar based machines). Thus, given the wide variety of configurations and arrangements of embodiments of the present invention the scope of the invention is reflected by the breadth of the claims below rather than narrowed by the embodiments described above.

What is claimed is:

1. A handlebar-based control system for a vehicle, comprising:
   a control panel configured for mounting on to a handlebar, the control panel including:
      one or more input devices, and
      a signal transmitter connected to the one or more input devices; and
   a computer program product resident on a mobile computing device for controlling one or more user interfaces on the computing device, the computer program product comprising a non-transitory computer readable storage medium having computer readable program code embodied therewith, the computer readable program code being configured, when executed by a computer processing unit in the computing device, to:
   detect a signal from the signal transmitter, wherein the signal represents a command from one of the one or more input devices, and
   control a feature on one of the one or more user interfaces on the computing device, in response to a user triggering one of the one or more input devices on the control panel; and
   a local interconnect network (LIN) switch coupled to the control panel, wherein:
      the control panel is connected to an on-board vehicle instrument cluster controlling vehicle functions and to a mobile computing device, and the LIN switch is configured to switch between a master mode and a slave mode, wherein:
the master mode places the control panel in control of the mobile computing device and computer program product, and
the slave mode places the control panel in control of the on-board vehicle instrument cluster.

2. The system of claim 1, wherein the signal transmitter is configured for wireless communication with the computing device.

3. The system of claim 1, wherein the signal transmitter is configured for wired communication with the computing device.

4. The system of claim 1, wherein the computing device is an electronic dashboard mounted onto the vehicle.

5. The system of claim 1, wherein the computing device is one of a mobile smartphone, computing tablet, or wearable smart computing device.

6. The system of claim 1, wherein the one or more input devices are from the group comprising buttons, switches, capacitive detectors, scrollers, and rotary dials.

7. The system of claim 1, wherein a function of the vehicle is controlled by the signal received from the signal representing the command from one of the one or more input devices.

* * * * *